July 26, 1955     G. H. COOK     2,713,809
WIDE-ANGLE FOUR COMPONENT OPTICAL OBJECTIVES
Filed Nov. 16, 1953
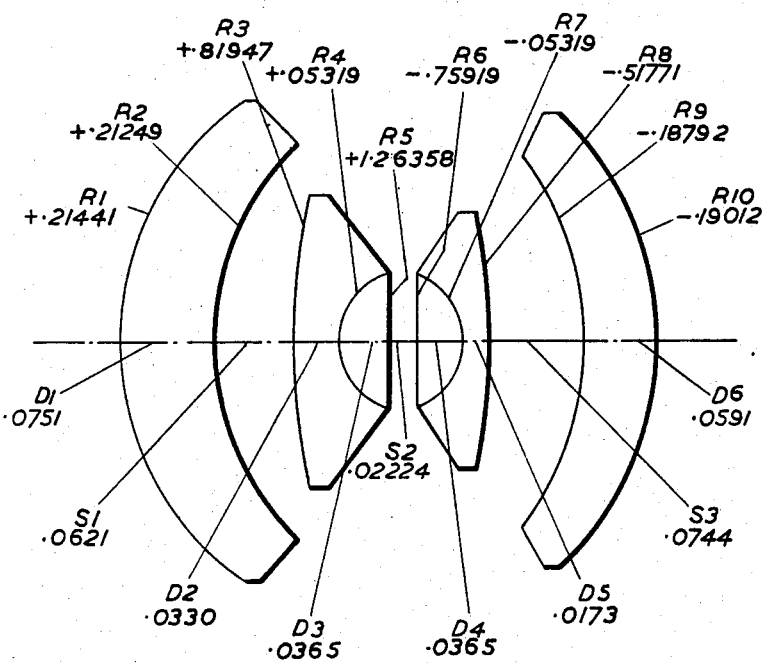
INVENTOR
Gordon H. Cook

United States Patent Office 2,713,809
Patented July 26, 1955

2,713,809

WIDE-ANGLE FOUR COMPONENT OPTICAL OBJECTIVES

Gordon Henry Cook, Leicester, England, assignor to Taylor, Taylor & Hobson Limited, Leicester, England, a British company Application November 16, 1953, Serial No. 392,365

Claims priority, application Great Britain November 20, 1952

19 Claims. (Cl. 88—57)

This invention relates to wide angle optical objectives of the kind including two strongly meniscus convergent components embracing a diaphragm between them, and with their surfaces concave towards such diaphragm. Such an objective, if having only two simple components, can be corrected for all the primary aberrations except spherical and chromatic aberrations, and has been used in such form for photographic or other purposes for which a very wide angle of view is required. It is also known to improve the corrections of such an objective for a higher aperture by adding two simple divergent meniscus inner components also having their surfaces concave towards the diaphragm between them.

Such an objective has also been used in conjunction with a register plate against which the photographic film can be pressed in the focal plane of the objective, and it has been proposed to utilise such plane-parallel register plate to assist in giving a very high degree of correction for distortion and in particular to choose such thickness for the register plate as to reduce to an extremely small value not only the primary distortion error but also the higher order distortion errors, the power of each component being less than the power of the whole objective.

The present invention has for its object to provide a modified form of such known objective wherein, for a somewhat reduced semi-angular field of the order of 47 degrees, all the primary aberrations, including spherical and chromatic aberrations, are well corrected and the desired extremely high degree of correction for distortion is also obtained and at the same time the physical dimensions of the objective as regards both diameter and axial length are kept relatively small.

The wide-angle objective according to the invention is corrected for spherical and chromatic aberrations, coma, astigmatism, field curvature and distortion, and comprises four convergent components of which the outer two are each of strongly meniscus form with their surfaces concave towards the diaphragm, whilst the inner two are each compound with a dispersive internal contact surface concave towards the diaphragm, the arithmetic mean of the focal lengths of the outer components lying between F and 4 F, whilst that of the inner components lies between 2 F and 12 F, where F is the equivalent focal length of the whole objective. Preferably, the arithmetic mean of the focal lengths of the outer components lies between 1.5 F and 3 F and that of the inner components between 3 F and 9 F.

The sum of the Petzval curvatures of the surfaces of the inner components is preferably algebraically less than $+5/4\ F$ and greater than the sum of the Petzval curvatures of the surfaces of the outer components, which in turn is algebraically greater than $-2/5\ F$. It should be made clear that the term "Petzval curvature" of a surface is herein used in its usual significance as defined by the expression $(N^1-N)/N^1NR$, where $N^1$ and $N$ are respectively the mean refractive indices of the media respectively behind and in front of the surface and R is the radius of curvature of the surface, reckoned positive when the surface is concave to the front.

The terms "front" and "rear" are herein used in accordance with the usual convention to relate to the sides of the objective respectively nearer to and further from the longer conjugate.

The centres of curvature of the outer surfaces of the two outer components preferably both lie between these two surfaces. Similarly, the centres of curvature of the internal contact surfaces of the two inner components preferably both lie between these two surfaces.

With regard to the air-exposed surfaces of the inner components, the algebraical sum of the radii of curvature of the outer surfaces and the corresponding sum for the inner surfaces are preferably both positive, reckoning a radius for this purpose as positive if the surface is concave towards the diaphragm, no one of these four surfaces having its centre of curvature between the outer surfaces of the outer components.

The overall axial length of the objective between the outer surfaces of the outer components conveniently lies between .3 F and .6 F, although for some uses of the objective it may be preferable to employ a longer overall axial length.

A convenient practical example of wide-angle objective according to the present invention is illustrated in the accompanying drawing.

Numerical data for this example are given in the following table, in which $R_1R_2$ . . . represent the radii of curvature of the individual surfaces of the objective, the positive sign indicating that the surface is convex to the front and the negative sign that is concave thereto, $D_1D_2$ . . . represent the axial thicknesses of the various elements, and $S_1S_2$ . . . represent the axial air separations between the components. The table also gives the mean refractive indices $n_D$ for the $d$-line (5875.6 Angstrom units) and the Abbé V numbers of the materials used for the elements of the objective.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

[Equivalent focal length 1.000. Relative aperture F/11.]

| Radius | Thickness or Air Separation | Refractive Index $n_d$ | Abbé V Number |
|---|---|---|---|
| $R_1 =+ .21441$ | $D_1=.0751$ | 1.74400 | 44.7 |
| $R_2 =+ .21249$ | $S_1=.0621$ | | |
| $R_3 =+ .81947$ | $D_2=.0330$ | 1.51507 | 56.4 |
| $R_4 =+ .05319$ | $D_3=.0365$ | 1.50970 | 64.4 |
| $R_5 =+1.26358$ | $S_2=.02224$ | | |
| $R_6 =− .75919$ | $D_4=.0365$ | 1,50970 | 64.4 |
| $R_7 =− .05319$ | $D_5=.0173$ | 1,51507 | 56.4 |
| $R_8 =− .51771$ | $S_3=.0744$ | | |
| $R_9 =− .18792$ | $D_6=.0591$ | 1,72340 | 38.0 |
| $R_{10}=− .19012$ | | | |

In this example, the focal lengths of the four components counting from the front are respectively 2.03 F, 7.34 F, 4.07 F and 2.19 F, so that the mean focal length of the two outer components is 2.11 F and that of the inner components is 5.70 F.

The Petzval sums for the four components are respectively $-.018/F$, $+.103/F$, $+.167/F$, and $-.026/F$, so that the Petzval sum for the pair of inner components is $+.270/F$ and that for the pair of outer components is $-.044/F$.

It will be seen that the centres of curvature of the surfaces $R_1$, $R_4$, $R_7$ and $R_{10}$ all lie close to the diaphragm in the middle of the central air space $S_2$. The centres of curvature of the surfaces $R_3$, $R_5$, $R_6$ and $R_8$, however, all lie outside the objective, these four surfaces all being concave towards the diaphragm. The overall axial length of the objective between the surfaces $R_1$ and $R_8$ is .416 F.

The diameters of the surfaces $R_1$, $R_3$, $R_8$ and $R_{10}$ are respectively .36 F, .22 F, .19 F and .34 F, the chamfer diameters of surfaces $R_2$ and $R_9$ both being .28 F.

This example has a semi-angular field of 47 degrees, and is adequately corrected for all the primary aberrations with a very high degree of correction for distortion, the distortion error being reduced to within .007 per cent of the equivalent focal length. It should be explained that the distortion error is defined as the difference between the radial position of the point of intersection with the paraxial image plane of a principal ray passing through the centre of the diaphragm and the ideal radial position determined by the paraxial magnification and the radial position of the corresponding point in the object plane (or, in the case of an object at infinity, determined by the angular position of the object point and the equivalent focal length). Although in the above table the relative aperture is given as F/11, it may sometimes be desirable to use the example at a lower relative aperture of say F/16 or F/22 if a still higher degree of distortion correction is desired.

This example has been designed for use without a register plate, but it will be appreciated that when photographic film is used such a plate may be required, in which case it will be necessary to re-design the example to introduce the appropriate amount of primary and higher order distortion to compensate for that of the register plate.

It will be understood that the foregoing example may also be modified in other ways to suit the requirements of the particular purpose for which it is to be used.

What I claim as my invention and desire to secure by Letters Patent is:

1. A wide-angle optical objective corrected for spherical and chromatic aberrations, coma, astigmatism, field curvature and distortion, and comprising four convergent components of which the outer two are each of strongly meniscus form with their surfaces concave to the diaphragm, whilst the inner two are each compound with a dispersive internal contact surface concave towards the diaphragm, the arithmetic mean of the focal lengths of the outer components lying between F and 4 F, whilst that of the inner components lies between 2 F and 12 F, where F is the equivalent focal length of the whole objective.

2. A wide-angle optical objective as claimed in claim 1, in which the arithmetic mean of the focal lengths of the outer components lies between 1.5 F and 3 F, and that of the inner components between 3 F and 9 F.

3. A wide-angle optical objective as claimed in claim 2, in which the centres of curvature of the outer surfaces of the two outer components both lie between such surfaces, and the centres of curvature of the internal contact surfaces in the two inner components both lie between such contact surfaces.

4. A wide-angle optical objective as claimed in claim 3, in which the algebraic sum of the radii of curvature of the outer surfaces of the inner components and that of the inner surfaces of such components are both positive, reckoning a radius of curvature as positive if the surface is concave towards the diaphragm, and each of these four outer surfaces has its center of curvature outside the outer surfaces of the two outer components.

5. A wide-angle optical objective as claimed in claim 2, in which the algebraic sum of the radii of curvature of the outer surfaces of the inner components and that of the inner surfaces of such components are both positive, in reckoning a radius of curvature as positive if the surface is concave towards the diaphragm, and each of these four outer surfaces has its center of curvature outside the outer surfaces of the two outer components.

6. A wide-angle optical objective as claimed in claim 2, in which the overall axial length of the objective between the outer surfaces of the two outer components lies between .3 F and .6 F.

7. A wide-angle optical objective as claimed in claim 1, in which the centres of curvature of the outer surfaces of the two outer components both lie between these two surfaces.

8. A wide-angle optical objective as claimed in claim 7, in which the centres of curvature of the internal contact surfaces in the two inner components both lie between these two surfaces.

9. A wide-angle optical objective as claimed in claim 1, in which the centres of curvature of the internal contact surfaces in the two inner components both lie between these two surfaces.

10. A wide-angle optical objective as claimed in claim 1, in which the algebraic sum of the radii of curvature of the outer surfaces of the inner components and that of the inner surfaces of such components are both positive, reckoning a radius of curvature as positive if the surface is concave towards the diaphragm, and each of these four outer surfaces has its center of curvature outside the outer surfaces of the two outer components.

11. A wide-angle optical objective as claimed in claim 1, in which the overall axial length of the objective between the outer surfaces of the two outer components lies between .3 F and .6 F.

12. A wide-angle optical objective corrected for spherical and chromatic aberrations, coma, astigmatism, field curvature and distortion, and comprising four convergent components of which the outer two are each of strongly meniscus form with their surfaces concave to the diaphragm, whilst the inner two are each compound with a dispersive internal contact surface concave towards the diaphragm, the arithmetic mean of the focal lengths of the outer components lying between F and 4 F, whilst that of the inner components lies between 2 F and 12 F, where F is the equivalent focal length of the whole objective, the sum of the Petzval curvatures of the surfaces of the inner components being algebraically less than $+5/4\ F$ and greater than the sum of the Petzval curvatures of the surfaces of the outer components, which in turn is algebraically greater than $-2/5\ F$.

13. A wide-angle optical objective as claimed in claim 12, in which the arithmetic mean of the focal lengths of the outer components lies between 1.5 F and 3 F, and that of the inner components between 3 F and 9 F.

14. A wide-angle optical objective as claimed in claim 13, in which the centres of curvature of the outer surfaces of the two outer components both lie between such surfaces, and the centres of curvature of the internal contact surfaces in the two inner components both lie between such contact surfaces.

15. A wide-angle optical objective as claimed in claim 12, in which the centres of curvature of the outer surfaces of the two outer components both lie between these two surfaces.

16. A wide-angle optical objective as claimed in claim 15, in which the centres of curvature of the internal contact surfaces in the two inner components both lie between these two surfaces.

17. A wide-angle optical objective as claimed in claim 12, in which the centres of curvature of the internal contact surfaces in the two inner components both lie between these two surfaces.

18. A wide-angle optical objective as claimed in claim 12, in which the algebraic sum of the radii of curvature of the outer surfaces of the inner components and that of the inner surfaces of such components are both positive, reckoning a radius of curvature as positive if the surface is concave towards the diaphragm, and each of these four outer surfaces has its center of curvature outside the outer surfaces of the two outer components.

19. A wide-angle optical objective as claimed in claim 12, in which the overall axial length of the objective between the outer surfaces of the two outer components lies between .3 F and .6 F.

References Cited in the file of this patent

UNITED STATES PATENTS

| | | |
|---|---|---|
| 706,650 | Goerz | Aug. 12, 1902 |
| 2,031,792 | Richter | Feb. 25, 1936 |
| 2,383,115 | Durand | Aug. 21, 1945 |
| 2,516,724 | Roossinov | July 25, 1950 |
| 2,518,719 | Reiss | Aug. 15, 1950 |

FOREIGN PATENTS

| | | |
|---|---|---|
| 680,185 | Great Britain | Oct. 1, 1952 |